（12）United States Patent
Sietsma et al.

(10) Patent No.: US 8,178,467 B2
(45) Date of Patent: May 15, 2012

(54) METAL NITRATE CONVERSION METHOD

(75) Inventors: Jelle Rudolf Anne Sietsma, Utrecht (NL); Adrianus jacobus Van Dillen, Culemborg (NL); Petra Elisabeth De Jongh, Utrecht (NL); Krijn Pieter De Jong, Houten (NL)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 12/158,854

(22) PCT Filed: Nov. 17, 2006

(86) PCT No.: PCT/GB2006/004277
§ 371 (c)(1),
(2), (4) Date: Oct. 21, 2008

(87) PCT Pub. No.: WO2007/071899
PCT Pub. Date: Jun. 28, 2007

(65) Prior Publication Data
US 2009/0305881 A1 Dec. 10, 2009

(30) Foreign Application Priority Data

Dec. 21, 2005 (GB) .................................. 0525887.6
Jun. 12, 2006 (GB) .................................. 0611464.9

(51) Int. Cl.
*B01J 21/00* (2006.01)
(52) U.S. Cl. ...................................................... 502/258
(58) Field of Classification Search .................. None
See application file for complete search history.

(56) References Cited

U.S. PATENT DOCUMENTS 6,316,382 B1* 11/2001 Kasztelan ..................... 502/216
2003/0064885 A1  4/2003 Krylova et al.

FOREIGN PATENT DOCUMENTS
EP        0 421 502 A2    4/1991
WO    WO-2007/071899 A1   6/2007

OTHER PUBLICATIONS

Marchetti et al, iron uniform size nanoparticles dispersed on mcm 41 used as hydrocarbon synthesis catalyst, 2002, hyperfine interactions, vol. 139/140, pp. 33-40.*
Choi et al, reduction of supported cobalt catalysts by hydrogen, 1995, catalysis letters 35, pp. 291-296.*
R. W. Lines; J. G. Harfield; W. D. Griffiths; A. P. Rood; and M. Alderliesten, "Standardisation in Particle Sizing," *Anal. Proc.*, May 1984, vol. 21, pp. 159-172.
*Kirk-Othmer Encyclopedia of Chemical Technology*, Second Completely Revised Edition, vol. 2: Aluminum Compounds to Azo Dyes (New York: The Interscience Encyclopedia, Inc., 1963), pp. 40-57.

(Continued)

*Primary Examiner* — Melvin Mayes
*Assistant Examiner* — Stefanie Cohen
(74) *Attorney, Agent, or Firm* — Ratner Prestia

(57) ABSTRACT

A method for converting a supported metal nitrate into the corresponding supported metal oxide comprises heating the metal nitrate to effect its decomposition under a gas mixture that contains nitric oxide and has an oxygen content of <5% by volume. The method provides very highly dispersed metal oxide on the support material. The metal oxide is useful as a catalyst or as a catalyst precursor.

18 Claims, 6 Drawing Sheets

OTHER PUBLICATIONS

P. Scherrer, "Bestimmung der Grösse und der inneren Struktur von Kolloidteilchen mittels Röntgenstrahlen," Nachrichten von der Königl. Gesellschaft der Wissenschaften zu Göttingen, Mathematisch-physikalische Klasse, 1918, pp. 98-100. With English translation: "Analysis of the size and the internal structure of colloid particles by means of x-rays."

Brunauer, P. H. Emmett, and E. Teller, "Adsorption of Gases in Multimolecular Layers," *J. Am. Chem. Soc.*, 1938, vol. 60, No. 2, pp. 309-319.

E. P. Barrett, L. G. Joyner, and P. P. Halenda, "The Determination of Pore Volume and Area Distributions in Porous Substances. I. Computations from Nitrogen Isotherms," *J. Am. Chem. Soc.*, 1951, vol. 73, No. 1, pp. 373-380.

S. G. Marchetti, M. V. Cagnoli; A M. Alvarez; J. F. Bengoa; N. G. Gallegos, A. A. Yeramián; and R. C. Mercader, "Iron Uniform-Size Nanoparticles Dispersed on MCM-41 Used as Hydrocarbon Synthesis Catalyst," *Hyperfine Interactions*, 2002, 139/140, pp. 33-40.

J. F. Bengoa et al., "Iron oxide nanoparticles inside the MCM-41 channels: Study of the structural stability of the support," *Microporous and Mesoporous Materials*, 2005, vol. 84, pp. 153-160.

R. Köhn et al., "Studies on the state of iron oxide nanoparticles in MCM-41 and MCM-48 silica materials," *Microporous and Mesoporous Materials*, 2003, vol. 63, pp. 125-137.

D. L. Huber, "Synthesis, Properties, and Applications of iron Nanoparticles," *Small*, 2005, vol. 1, No. 5, pp. 482-501.

Hongfang Li et al., "Nickel oxide nanocrystallites within the wall of ordered mesoporous carbon CMK-3: Synthesis and characterization," *Microporous and Mesoporous Materials* 89 (2006), pp. 196-203.

Office Action dated Dec. 2, 2011 from U.S. Appl. No. 12/439,915.

\* cited by examiner

METAL NITRATE CONVERSION METHOD

CROSS-REFERENCE TO RELATED APPLICATIONS

This application is the U.S. National Phase application of PCT International Application No. PCT/GB2006/004277, filed Nov. 17, 2006, and claims priority of British Patent Application No. 052887.6, filed Dec. 21, 2005, and British Patent Application No. 0611464.9, filed Jun. 12, 2006, all of which are incorporated herein by reference.

FIELD OF THE INVENTION

This invention relates to methods for conversion of metal nitrates to from the corresponding metal oxides.

BACKGROUND OF THE INVENTION

Metal nitrates are useful metal oxide precursors due to their relatively low cost and ease of manufacture. They are often converted into the corresponding metal oxides in catalyst or sorbent manufacture. In catalyst or sorbent manufacture typically one or more soluble metal nitrates is impregnated onto a suitable support material, and dried to remove the solvent. The impregnated support is then usually heated under air, in a step often called calcination, to an elevated temperature at or above the decomposition temperature of the metal nitrate to form the metal oxide. However, such a method does not always lead to satisfactory oxidic materials. In particular, where the metal oxide is a reducible metal oxide, the dispersion and distribution of crystallites of the metal oxide and hence reduced metal obtained by these processes is often poor.

Variations on this preparative method have been attempted. EP0421502 describes a process for the preparation of a catalyst or catalyst precursor wherein cobalt nitrate supported on a porous inert carrier is calcined in an atmosphere containing at least 20% volume nitrogen oxide (not taking the water content of the atmosphere into consideration). The nitrogen oxides preferably originated from the decomposition of cobalt nitrate under conditions where the calcination oven was not purged or purged at low velocity. Such calcination was stated to produce agglomerates of cobalt oxide crystallites with dimensions in the range 1 to 10 micrometers.

In the aforesaid EP0421502 calcination of the cobalt nitrate was performed in air, with the nitrogen oxide being provided by the metal nitrate itself. Whereas the specific nitrogen oxide was not stated, the nitrogen oxide predominant during such calcination will be nitrogen dioxide ($NO_2$).

Supported metal oxides find use as catalysts, catalyst precursors and sorbents whose effectiveness is related to the dispersion of the metal oxide on the support. Therefore there is a desire to improve the dispersion of metal oxides derived from metal nitrates.

SUMMARY OF THE INVENTION

We have found that heat treatment under a gas mixture that specifically contains nitric oxide, and that contains no or low amounts of oxygen leads to very highly dispersed and uniformly distributed supported metal oxides. In contrast to the method of EP0421502, high concentrations of nitrogen oxide are not required in the method of the present invention and the method is able to provide extremely small metal oxide agglomerates having a crystallite size <10 nanometers.

Accordingly the invention provides a method for converting a supported metal nitrate into the corresponding supported metal oxide comprising heating the metal nitrate to effect its decomposition under a gas mixture containing nitric oxide and having an oxygen content of <5% by volume.

The invention further provides a supported metal oxide obtainable by the above method.

Thus method of the present invention comprises passing a gas mixture that contains nitric oxide and has an oxygen content of <5% volume, over a supported metal nitrate and heating the metal nitrate exposed to this gas mixture to at least its decomposition temperature. Hence, in the present invention the nitric oxide is not generated by decomposition of the metal nitrate but should be present in the flowing gas mixture to which the metal nitrate is exposed during decomposition.

BRIEF DESCRIPTION OF THE DRAWINGS

The invention is further illustrated by reference to the figures, in which.

DETAILED DESCRIPTION OF THE INVENTION

Figure 1A:
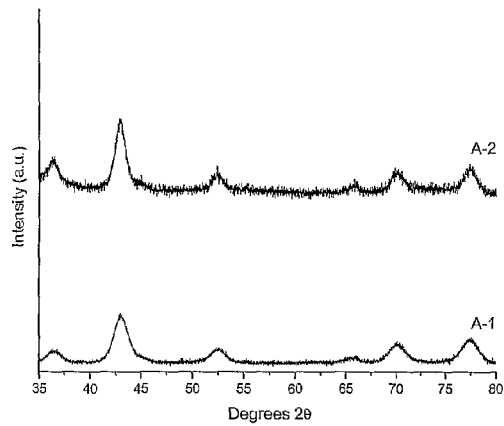
FIG. 1 depicts XRD patterns of a (a) silica supported cobalt oxide prepared according to the invention (A-1) and not according to the invention (A-2), and (b) silica-supported nickel oxide prepared according to the invention (B-1, C-1) and not according to the invention (B-2, C-2)

The metal nitrate may be supported in a number of ways including dry mixing, molten nitrate mixing, precipitation and impregnation. Impregnation is preferred. For example the metal nitrate may be impregnated onto a support material from an aqueous or non-aqueous solution, e.g. ethanol, which may include other materials, and then dried to remove the solvent or solvents. One or more metal nitrates may be present in the solution. One or more impregnation steps may be performed to increase metal loading or provide sequential layers of different metal nitrates prior to drying. Impregnation may be performed using any of the methods known to those skilled in the art of catalyst or sorbent manufacture, but preferably is by way of a so-called 'dry' or 'incipient-wetness' impregnation as this minimises the quantity of solvent used and to be removed in drying. Incipient wetness impregnation is particularly suitable for porous support materials and comprises mixing the support material with only sufficient solution to fill the pores of the support.

Drying may be performed using known methods at reduced pressure, atmospheric pressure or elevated pressure, including spray drying and freeze drying. The temperature of the drying step is preferably $\leqq 200°$ C., more preferably $\leqq 160°$ C. to minimise premature degradation of the metal nitrate. The drying step may be performed under air or another oxygen containing gas, or an inert gas such as nitrogen, helium or argon.

The supported metal nitrate will therefore comprise one or more metal nitrates on the surface and/or in the pores of the support.

The metal nitrate is heated to bring about its decomposition by heating it to, or if desired above, its decomposition temperature at which it forms the metal oxide. This heating step is different from drying (which principally acts to remove solvent) by causing a physio-chemical conversion of the metal nitrate to the corresponding metal oxide. It will be understood that in the method of the present invention a supported metal nitrate may, if desired, be dried and heated to decomposition in a single operation. The temperature to which the metal nitrate is raised to bring about its decomposition may be in the range 100-1200° C., but preferably the temperature is in the range 200-600° C. to ensure conversion of the nitrate to the oxide while at the same time minimising sintering of the oxide. It has been found that smaller metal oxide crystallites may be obtained by calcination at lower temperatures in this range, e.g. between 200 and 450° C., particularly 200-300° C. However, where it is desired to form spinel or perovskite oxide phases on or with the support, it may be desirable to use temperatures in the range 500-1200° C. The time at which the supported metal nitrate is at a temperature within these ranges range is preferably <16 hours, more preferably <8 hours. Short calcination times, e.g. $\leqq 4$ hours, particularly $\leqq 2$ hours, are most preferred.

Preferably at least 90% wt, more preferably at least 95%, most preferably at least 99% of the metal nitrate is converted into the corresponding metal oxide.

It is a feature of the present invention that the atmosphere to which the supported metal nitrate is exposed during heating contains very little or no free oxygen as this has been found to be a source of poor metal oxide dispersion in nitrate-derived materials. Hence the oxygen ($O_2$) content of the gas stream is <5%, preferably <1%, most preferably <0.1% by volume.

The gas stream to which the metal nitrate is exposed may be any gas stream that contains nitric oxide and has <5% oxygen by volume. Preferably the gas stream comprises one or more gases selected from carbon monoxide, carbon dioxide or an inert gas. Preferably the inert gas is one or more selected from nitrogen, helium or argon. Preferably the gas stream to which the supported metal oxide is exposed consists of one or more inert gases and nitric oxide.

The gas mixture to which the supported metal nitrate is exposed may be at or above atmospheric pressure, typically up to about 10 bar abs. Various methods, known in the art for performing the heating step may be used. For example a reducing gas stream may be passed through a bed of particulate supported metal nitrate. Where the heating step is performed by passing the gas mixture through a bed of the supported metal oxide, the gas-hourly-space-velocity (GHSV) of the gas mixture is preferably in the range of 100-600000 $h^{-1}$, more preferably 600-100000 $h^{-1}$, most preferably 1000-60000 $h^{-1}$.

The nitric oxide concentration in the gas stream is preferably in the range 0.001 to 15% by volume, more preferably 0.01 to 10% vol, most preferably 0.1 to 5% vol to minimise scrubbing requirements.

The metal nitrate may be any metal nitrate but is preferably a nitrate of a metal used in the manufacture of catalysts, catalyst precursors or sorbents. The metal nitrate may be an alkali-, alkali metal- or transition metal-nitrate. Preferably the metal nitrate is a transition metal nitrate, i.e. a nitrate of metals selected from Groups 3-12 inclusive of the Periodic Table of the Elements. Suitable metal readily available nitrates for catalyst, catalyst precursor or sorbent manufacture include nitrates of La, Zr, Cr, Mn, Fe, Ru, Co, Rh, Ir, Ni, Pd, Pt, Cu and Zn, more preferably nitrates of Cr, Mn, Fe, Ru, Co, Rh, Ir, Ni, Pd, Pt, Cu and Zn.

One or more metal nitrates may be present. By the term "metal nitrate" we include metal nitrate compounds of formula $M(NO_3)_x.(H_2O)_a$ where x is the valency of the metal M, and 'a' may be 0 or an integer$\geqq 1$, and also partial decomposition products of such compounds formed for example during a previous drying step, such as metal hydroxy nitrates.

We have found the present process particularly useful for producing highly dispersed reducible metal oxides, i.e. a metal oxide in which at least part of the metal may be reduced using a reducing gas stream, such as carbon monoxide and/or hydrogen, to its elemental form. Such reducible metal oxides include those of Ni, Co, Cu and Fe and therefore in a preferred embodiment, the metal nitrate is a nitrate of nickel, cobalt, copper, or iron, more preferably nickel or cobalt, especially nickel. One or more metal nitrates may be present, e.g. Cu/Ni, Co/Ni materials are included.

The support onto which the metal nitrate may be supported may be a metal, carbon, metal oxide, mixed metal oxide or solid polymer support. For example, the support may be a single or mixed metal oxide including silica or silicates, or another type of support useful in catalyst or sorbent manufacture, for example, metals, metal alloys or carbons. One or more supports may be used in the present invention.

Carbon supports, such as activated carbons, high surface area graphites, carbon nanofibres, and fullerenes in powder, pellet or granular form and having suitable porosities, e.g. above 0.1 ml/g may be used as supports for the present invention, preferably where the gas stream contains <0.1% oxygen by volume. Such supports cannot be used in prior art methods where air calcination is used.

Preferably the support is an oxidic support, which may be a single- or mixed metal oxide material, including ceramics, zeolites, perovskites, spinels and the like. The oxidic support may also be in the form of a wash-coat on a ceramic, metal, carbon or polymer substrate.

The support may be in the form of a powder having a surface-weighted mean diameter D[3,2] in the range 1 to 200 microns. The term surface-weighted mean diameter D[3,2], otherwise termed the Sauter mean diameter, is defined by M. Alderliesten in the paper "A Nomenclature for Mean Particle Diameters"; Anal. Proc., vol 21, May 1984, pages 167-172, and is calculated from the particle size analysis, which may conveniently be effected by laser diffraction for example using a Malvern Mastersizer. Agglomerates of such powders having particle sizes in the range 200 microns to 1 mm may also be used as the support. Alternatively the support may be in the form of shaped units such as pellets, extrudates or granules typically having particle sizes in the range 1-25 mm and an aspect ratio of less than 2. (By particle size we mean the smallest particle dimension such as width, length or diameter). Alternatively the support may be in the form of a monolith, e.g. a honeycomb, or a cellular material such as an open foam structure.

The support is preferably selected from alumina, metal-aluminate, silica, aluminosilicate, titania, zirconia or mixtures of these, including co-gels, either in powder, shaped unit, monolithic or cellular form.

The support may be a silica support. Silica supports may be formed from natural sources, e.g. as kieselguhr, may be a pyrogenic or fumed silica or may be a synthetic, e.g. precipitated silica or silica gel. Structured mesoporous silicas, such as SBA-15 may be used as a support. Precipitated silicas are preferred. The silica may be in the form of a powder or a shaped material, e.g. as extruded, pelleted or granulated silica pieces. Suitable powdered silicas typically have particles of surface weighted mean diameter D[3,2] in the range 3 to 100 µm. Shaped silicas may have a variety of shapes and particle sizes, depending upon the mould or die used in their manufacture. For example the particles may have a cross-sectional shape which is circular, lobed or other shape and a length from about 1 to greater than 10 mm. The BET surface area of suitable powdered or granular silicas is generally in the range 10-500 $m^2/g$, preferably 100-400 $m^2g^{-1}$. The pore volume is generally between about 0.1 and 4 ml/g, preferably 0.2-2 ml/g and the mean pore diameter is preferably in the range from 0.4 to about 30 nm. If desired, the silica may be mixed with another metal oxide, such as titania or zirconia. The silica may alternatively be present as a coating on a shaped unit, which is preferably of alumina typically as a coating of 0.5 to 5 monolayers of silica upon the underlying support.

The support may be a titania support. Titania supports are preferably synthetic, e.g. precipitated titanias. The titania may optionally comprise e.g. up to 20% by weight of another refractory oxide material, typically silica, alumina or zirconia. The titania may alternatively be present as a coating on a support which is preferably of silica or alumina, for example as a coating of 0.5 to 5 monolayers of titania upon the underlying alumina or silica support. The BET surface area of suitable titania is generally in the range 10-500 $m^2/g$, preferably 100 to 400 $m^2/g$. The pore volume of the titania is preferably between about 0.1 and 4 ml/g, more preferably 0.2 to 2 ml/g and the mean pore diameter is preferably in the range from 2 to about 30 nm.

Similarly zirconia supports may be synthetic, e.g. precipitated zirconias. The zirconia may again optionally comprise e.g. up to 20% by weight of another refractory oxide material, typically silica, alumina or titania. Alternatively the zirconia may be stabilised e.g. an yttria- or ceria-stabilised zirconia. The zirconia may alternatively be present as a coating on a support, which is preferably of silica or alumina, for example as a coating of 0.5 to 5 monolayers of zirconia upon the underlying alumina or silica support.

The support may be a metal aluminate, for example a calcium aluminate.

The support material may be a transition alumina. Transition aluminas are defined in "Ullmans Encyklopaedie der technischen Chemie", 4., neubearbeitete und erweiterte Auflage, Band 7 (1974), pp. 298-299. Suitable transition alumina may be of the gamma-alumina group, for example eta-alumina or chi-alumina. These materials may be formed by calcination of aluminium hydroxides at 400 to 750° C. and generally have a BET surface area in the range 150 to 400 $m^2/g$. Alternatively, the transition alumina may be of the delta-alumina group which includes the high temperature forms such as delta- and theta-aluminas which may be formed by heating a gamma group alumina to a temperature above about 800° C. The delta-group aluminas generally have a BET surface area in the range 50 to 150 $m^2/g$. Alternatively, the transition alumina may be alpha-alumina. The transition aluminas contain less than 0.5 mole of water per mole of $Al_2O_3$, the actual amount of water depending on the temperature to which they have been heated. A suitable transition alumina powder generally has a surface-weighted mean diameter D[3,2] in the range 1 to 200 µm. In certain applications such as for catalysts intended for use in slurry reactions, it is advantageous to use very fine particles which are, on average, preferably less than 20 µm, e.g. 10 µm or less. For other applications e.g. as a catalyst for reactions carried out in a fluidised bed, it may be desirable to use larger particle sizes, preferably in the range 50 to 150 µm. It is preferred that the alumina powder has a relatively large average pore diameter as the use of such aluminas appears to give catalysts of particularly good selectivity. Preferred aluminas have an average pore diameter of at least 10 nm, particularly in the range 15 to 30 nm. [By the term average pore diameter we mean 4 times the pore volume as measured from the desorption branch of the nitrogen physisorption isotherm at 0.98 relative pressure divided by the BET surface area]. Preferably, the alumina material is a gamma alumina or a theta alumina, more preferably a theta alumina, having a BET surface area of 90-120 $m^2/g$ and a pore volume of 0.4-0.8 $cm^3/g$. The alumina support material may be in the form of a spray dried powder or formed into shaped units such as spheres, pellets, cylinders, rings, or multi-holed pellets, which may be multi-lobed or fluted, e.g. of cloverleaf cross-section, or in the form of extrudates known to those skilled in the art. The alumina support may be advantageously chosen for high filterability and attrition resistance.

The present invention may be used to convert metal nitrates on any support material, however, certain metal nitrate/support combinations are more preferred. For example, depending upon the metal it may be, or may not be, desirable to combine the metal nitrate with a support that is able, under the heating conditions used to decompose the metal nitrate, form mixed metal oxide compounds with the resulting supported metal oxide. Low-activity supports such as carbon or alpha-alumina may be used to reduce or prevent mixed-metal oxide formation with the support where this is undesired.

As stated above, we have found the process of the present invention to be particularly useful for preparing highly dispersed reducible metal oxides on supports. Therefore in one embodiment, the process further comprises heating the supported reducible metal oxide under a reducing gas stream to effect reduction of at least a part of the metal oxide. Any reducing gas stream may be used however preferably the reducing gas stream comprises carbon monoxide and/or hydrogen.

Accordingly the invention further provides a supported reduced metal oxide obtainable by the above method. A supported reduced metal oxide will comprise a metal in the elemental form, and possibly unreduced metal oxide, on the support material. In addition, other, reducible or non-reducible metal oxides may be present on the support.

In this embodiment, the supported metal oxide comprises at least one reducible metal oxide; preferably one or more selected from nickel oxide, cobalt oxide, copper oxide or iron oxide and the reduction is preferably performed with a hydrogen-containing gas.

Thus a reduction step may be performed by passing a hydrogen-containing gas such as hydrogen, synthesis gas or a mixture of hydrogen with nitrogen, methane or other inert gas over the supported reducible metal oxide at elevated temperature, for example by passing the hydrogen-containing gas over the composition at temperatures in the range 150-600° C., preferably 300-500° C. for between 0.1 and 24 hours, at atmospheric or higher pressures up to about 25 bar. The optimum reducing conditions for nickel oxide, cobalt oxide, copper oxide or iron oxides are known to those skilled in the art.

In the supported reduced metal oxides prepared by the method of the present invention preferably at least 70%, more preferably >80% and most preferably >90% of the reducible metal oxide is reducible to the elemental active form. Reduced metal oxides with very high metal dispersions, expressed as metal surface area per gram catalyst or gram metal in the reduced material may be obtained by the method of the present invention. Metal surface areas may conveniently be determined by chemisorption (e.g. hydrogen chemisorption) using methods known to those skilled in the art.

The supported metal oxides and reduced metal oxides have considerably higher metal oxide and metal dispersions than the metal oxide and reduced metal oxides obtainable using prior art methods. This is because the decomposition of the metal nitrate in the presence of the nitric oxide in a gas stream having <5% by volume oxygen prevents the sintering of the metal oxide that would otherwise occur.

The supported metal oxides of the present invention have been found by Scanning Transmission Electron Microscopy (STEM) and X-Ray Diffraction (XRD) to have metal oxide crystallite sizes of less than 10 nanometers, preferably less than 5 nanometers at resulting metal oxide loadings on the supports of up to 30% by weight. The crystallite sizes of the supported reduced metal oxides are also <10 nm, preferably <5 nm.

The supported metal oxides and supported reduced metal oxides may be used in many fields of technology. Such areas include catalyst, catalyst precursors, sorbents, semi-conductors, superconductors, magnetic storage media, solid-state storage media, pigments and UV-absorbents. Preferably, the supported metal oxides and supported reduced metal oxides are used as catalysts, catalyst precursors or sorbents. By the term "sorbents" we include adsorbents and absorbents.

For example reduced supported Cu oxides such as $Cu/ZnO/Al_2O_3$ are used as methanol synthesis catalysts and water-gas shift catalysts. Reduced supported Ni, Cu and Co oxides may be used alone or in combination with other metal oxides, e.g. Zn oxide, as catalysts for hydrogenation reactions and the reduced Fe or Co oxides may be used as catalysts for the Fischer-Tropsch synthesis of hydrocarbons. Reduced Fe catalysts may also be used in high-temperature shift reactions and in ammonia synthesis.

In preferred embodiments, the supported metal oxides and supported reduced metal oxides are used as catalysts in hydrogenation reactions and the Fischer-Tropsch synthesis of hydrocarbons. These catalysts may in addition to the Ni, Cu, Co or Fe, further comprise one or more suitable additives and/or promoters useful in hydrogenation reactions and/or Fischer-Tropsch catalysis. For example, the Fischer-Tropsch catalysts may comprise one or more additives that alter the physical properties and/or promoters that effect the reducibility or activity or selectivity of the catalysts. Suitable additives are selected from compounds of potassium (K), molybdenum (Mo), nickel (Ni), copper (Cu), iron (Fe), manganese (Mn), titanium (Ti), zirconium (Zr), lanthanum (La), cerium (Ce), chromium (Cr), magnesium (Mg) or zinc (Zn). Suitable promoters include rhodium (Rh), iridium (Ir), ruthenium (Ru), rhenium (Re), platinum (Pt) and palladium (Pd). Preferably one or more promoters selected from Ru, Re, Pt or Pd is included in the catalyst precursor. Additives and/or promoters may be incorporated into the catalysts by use of suitable compounds such as acids, e.g. perrhenic acid, metal salts, e.g. metal nitrates or metal acetates, or suitable metal-organic compounds, such as metal alkoxides or metal acetylacetonates. The amount of promoter metal may be varied between 3 and 50%, preferably between 5 and 20% by weight on reducible metal.

As stated above, supported reduced metal oxide catalysts may be used for example for hydrogenation reactions, particularly Ni and Co catalysts and for the Fischer-Tropsch synthesis of hydrocarbons, particularly Co and Fe catalysts.

Typical hydrogenation reactions include the hydrogenation of aldehydes and nitriles to alcohols and amines respectively, and the hydrogenation of cyclic aromatic compounds or unsaturated hydrocarbons. The catalysts of the present invention are particularly suitable for the hydrogenation of unsaturated organic compounds particularly oils, fats, fatty acids and fatty acid derivatives like nitriles. Such hydrogenation reactions are typically performed in a continuous or batch-wise manner by treating the compound to be hydrogenated with a hydrogen-containing gas under pressure in an autoclave at ambient or elevated temperature in the presence of the catalyst, for example the hydrogenation may be carried out with hydrogen at 80-250° C. and a pressure in the range $0.1$-$5.0 \times 10^6$ Pa.

The Fischer-Tropsch synthesis of hydrocarbons is well established. The Fischer-Tropsch synthesis converts a mixture of carbon monoxide and hydrogen to hydrocarbons. The mixture of carbon monoxide and hydrogen is typically a synthesis gas having a hydrogen:carbon monoxide ratio in the range 1.7-2.5:1. The reaction may be performed in a continuous or batch process using one or more stirred slurry-phase reactors, bubble-column reactors, loop reactors or fluidised bed reactors. The process may be operated at pressures in the range 0.1-10 Mpa and temperatures in the range 150-350° C. The gas-hourly-space-velocity (GHSV) for continuous operation is in the range 100-25000 $hr^{-1}$. The catalysts of the present invention are of particular utility because of their high metal surface areas/g catalyst.

The invention is further illustrated by reference to the following Examples.

EXAMPLES

Example 1

SBA-15 Supported Nickel and Cobalt Oxides

An incipient wetness impregnation step was performed with cobalt (II) nitrate or nickel (II) nitrate aqueous solutions of varying concentrations on SBA-15 powder (BET surface area=637 $m^2 g^{-1}$, total pore volume=0.80 $cm^3 g^{-1}$) to provide 15 wt % $Co/SiO_2$ (sample A) and 12 and 20 wt % $Ni/SiO_2$ (sample B and C). After an equilibration time of 15 minutes the impregnated solids were dried by heating the samples with a heating rate of 1° C. $min^{-1}$ from 25° C. to a final temperature of 70° C. for sample A and 120° C. for sample B and C. The samples were kept at the final temperature for 720 minutes. A small amount (60 mg) of the samples A, B and C was given a second heat treatment in a plug flow reactor (diameter 1 cm, length 17 cm) with a heating rate of 1° C. $min^{-1}$ from 25° C. to 450° C. and held for 240 minutes at 450° C. in a flow of helium containing 1% by volume nitric oxide (NO) or in air (viz. calcination). The samples thermally treated according to the present invention in a gas stream of helium containing 1% by volume nitric oxide (NO) were designated A-1, B-1 and C-1 while the air-calcined samples, not according to the present invention, were denoted as A-2, B-2 and C-2. The preparative conditions are summarised in Tables 1-3.

TABLE 1

Impregnation conditions

| | Cobalt (A) | Nickel (B and C) |
|---|---|---|
| Support Quantity (g) | 0.25 | 0.25 |
| Precursor | $Co(NO_3)_2 \cdot 6H_2O$ | $Ni(NO_3)_2 \cdot 6H_2O$ |
| Concentration Precursor solution (M) | 3.01 | 1.26 (B) and 4.23 (C) |
| Impregnation | 60 mbar incipient wetness no rotation | 60 mbar incipient wetness no rotation |
| Equilibration time (min) | 15 | 15 |

TABLE 2

Drying conditions

| | Cobalt (A) | Nickel (B) |
|---|---|---|
| Starting Temperature (° C.) | 25 | 25 |
| Final Temperature (° C.) | 70 | 120 |
| Heating rate (° C. min$^{-1}$) | 1 | 1 |
| Time at final temperature (min) | 720 | 720 |
| Atmosphere | air | air |

TABLE 3

Temperature and gas flow profile second thermal treatment

| Step N° | Duration (min) | $T_{start}$ (° C.) | $T_{final}$ (° C.) | Heating Rate (° C. min$^{-1}$) | He (ml min$^{-1}$) | NO/He* or air (ml min$^{-1}$) |
|---|---|---|---|---|---|---|
| 1 | 10 | 25 | 25 | 0 | 90 | 0 |
| 2 | 425 | 25 | 450 | 1 | 0 | 90 |
| 3 | 240 | 450 | 450 | 0 | 0 | 90 |
| 4 | 45 | 450 | 25 | −10 | 90 | 0 |

*concentration premixed gas bottle is 1 v/v % NO/He

The samples A-1, B-1, C-1, A-2, B-2 and C-2 were characterised using X-ray powder diffraction (XRD), scanning transmission electron microscopy (STEM) and nitrogen physisorption. XRD patterns were obtained at room temperature from 35 to 80° 2θ with a Bruker-Nonius D8 Advance X-ray Diffractometer setup using Co—K$_{\alpha12}$ (λ=1.79026 Å) radiation. The average cobalt and nickel oxide crystal sizes were calculated according to the Scherrer equation [see Scherrer, P. *Göttinger Nachrichten* 2 (1918) 98] using the most intense reflection at 2θ=43.1 and 50.8°, respectively. STEM images were obtained using a Tecnai 20 FEG microscope operating at 200 kV. The average cobalt and nickel oxide particle sizes were determined by the diameter of typically 50 particles.

Nitrogen physisorption measurements were performed at 77 K using a Micromeritics Tristar 3000 apparatus. The samples were dried in helium flow for 14 hours at 120° C. prior to analysis. Surface areas and total pore volumes were determined using the BET method [see Brunauer, S.; Emett, P. H. and Teller, E. *J. Am. Chem. Soc.* 60 (1938) 309] and the quantity of nitrogen adsorbed at a relative pressure of 0.995, respectively. Pore size distributions were calculated from the adsorption branch of the isotherm using standard BJH theory [see Barret, P.; Joyner, L. G.; Halenda, P. P. *J. Am. Chem. Soc.* 73 (1951) 373].

Figure 1B:
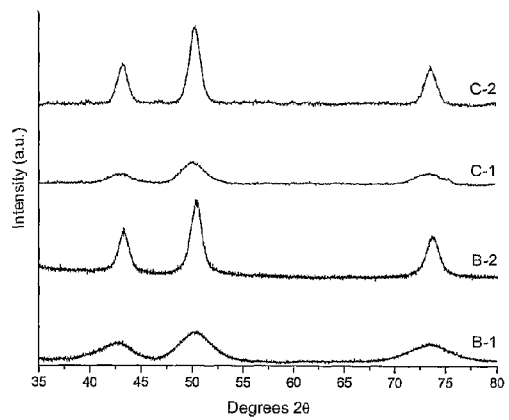

The XRD patterns depicted in FIG. 1 demonstrate that large $Co_3O_4$ and NiO crystallites are formed when samples A, B and C are thermally treated in air (calcination). However, very small $Co_3O_4$ and NiO crystallites are formed when the dried samples A, B and C are treated according to the process of the present invention. A comparison of the average crystallite sizes is given in Table 4.

TABLE 4

Overview of average cobalt and nickel oxide crystallite sizes

| Sample | Gas composition thermal treatment | $d_{XRD}$ (nm) | $d_{TEM}$ (nm) |
|---|---|---|---|
| A-1 | NO/He | 5 | 4-5 |
| A-2 | Air | 10 | 10-100* |
| B-1 | NO/He | 3 | # |
| B-2 | Air | 9 | 7-40* |
| C-1 | NO/He | 4 | 4-5 |
| C-2 | Air | 10 | 8-60* |

Figure 2:
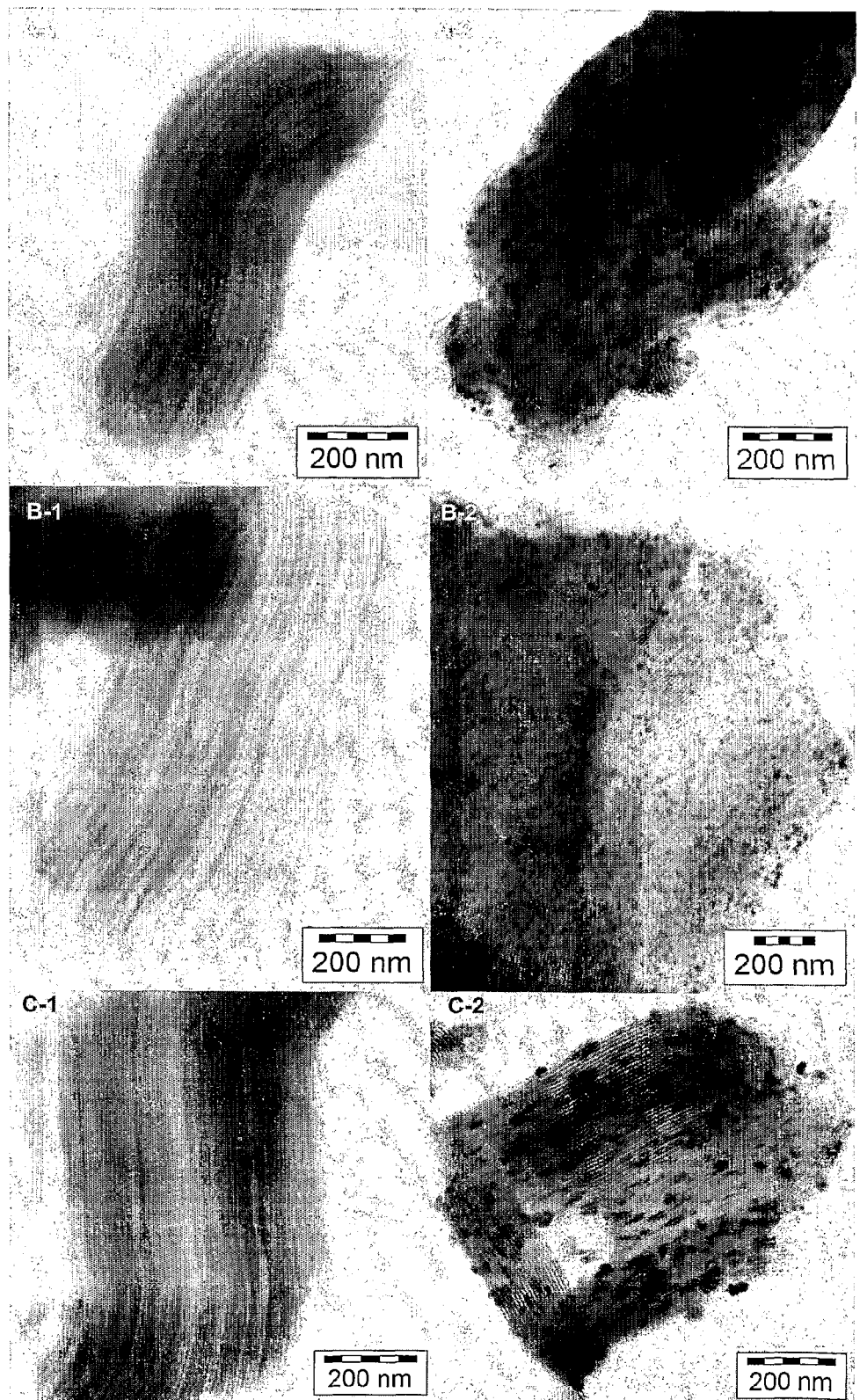
FIG. 2 depicts bright-field STEM micrographs of the silica-supported cobalt (A-1, A-2) and nickel (B-1, B-2, C1, C-2) oxides.

*crystallites inside the pores of SBA-15 are mostly anisotropic
NiO particle diameter too small to determine Typical bright-field STEM images of samples A-1, A-2, B-1, B-2, C-1 and C-2 (FIG. 2) show that the pore structure of SBA-15 formed by open mesopores is retained. The micrographs clearly demonstrate that the samples (A-2, B-2 and C-2) prepared via the calcination treatment yield SBA-15 supported materials that have an inhomogeneous dispersion and distribution of cobalt and nickel oxide particles throughout the mesopores of SBA-15. Moreover the micrographs show that the majority of the cobalt and nickel oxide particles present inside the mesoporous channels of SBA-15 have been restricted in growth in one dimension by the pore wall of the mesopores yielding anisotropic particles that plug the pores of SBA-15.

Furthermore the STEM images of these samples demonstrate that cobalt and nickel oxide particles are present that are larger than the pore diameter. This indicates that these particles are situated at the exterior surface area of the support.

However, the STEM images of the samples (A-1, B-1 and C-1) prepared according to the present invention clearly demonstrates that this procedure yields highly dispersed cobalt and nickel oxide particles that are homogeneously distributed throughout the pores of SBA-15. Furthermore no cobalt and nickel oxide particles are found at the exterior surface area of the support. A comparison of the particle size distribution of cobalt and nickel oxide of the samples A-1, A-2, B-1, B-2, C-1 and C-2 can be found in Table 4.

Figure 3:
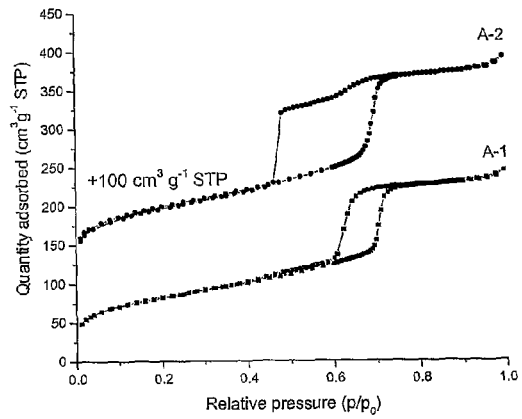
FIG. 3 depicts nitrogen physisorption isotherms of the silica-supported cobalt oxides (A-1, A-2)
Figure 4A:
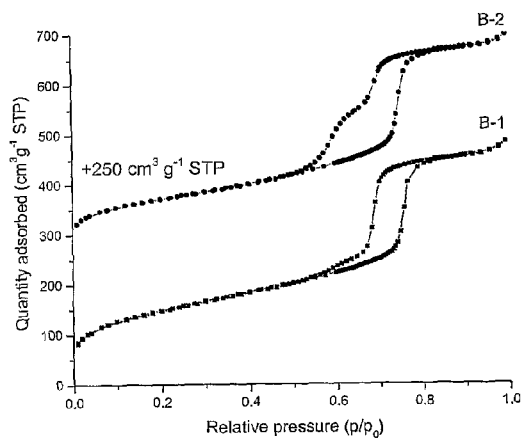
FIG. 4 depicts (a) nitrogen physisorption isotherms of the silica-supported nickel oxides B-1, B-2 and (b), C-1, C-2.
Figure 4B:
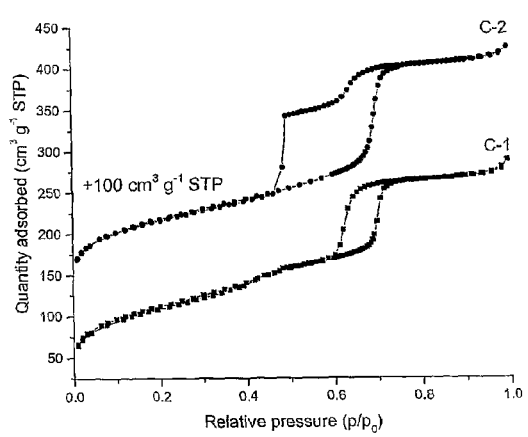

The nitrogen physisorption isotherm of sample A-1 (FIG. 3) contains all typical features reported for SBA-15 demonstrating that the structure is not damaged by the process of the present invention. Comparison of this isotherm with that of the calcined sample A-2 shows that for the latter besides the typical features for SBA-15 a forced closure of the desorption branch is observed. This forced closure can be attributed to blocking of the mesoporous channels of SBA-15 by cobalt oxide crystallites. These cobalt oxide plugs create ink-bottle type pores that result in the observed forced closure of the isotherm during desorption. The absence of this feature in the isotherm of sample A-1 additionally confirms that very small cobalt oxide crystallites are formed by the process of the present invention as no crystallites are present that are large enough to block the mesopores of SBA-15.

Comparison of the nitrogen physisorption isotherms for the Ni/SiO$_2$ samples with the Co/SiO$_2$ samples shows that a similar trend is observed, namely pore blocking of the mesopores of SBA-15 when SBA-15 supported nickel oxide materials are prepared through calcination, whereas application of the invented process results in a normal closure of the desorption branch as expected for SBA-15 with unblocked mesoporous channels.

Example 2

Silica Gel Supported Cobalt and Nickel Oxides

A Davicat SI 1404 silica gel (BET surface area=540 m$^2$ g$^{-1}$, total pore volume=0.90 cm$^3$ g$^{-1}$) was impregnated with cobalt (II) nitrate or nickel (II) nitrate from aqueous solution to provide 18 wt % Co/SiO$_2$ (sample D) or 24 wt % Ni/SiO$_2$ (sample E). After ageing for 15 minutes the samples D and E were dried by using the same heat treatment as used in example 1. Small amounts (100 mg) of sample D and E were given a second thermal treatment in a plug flow reactor (diameter 1 cm, length 17 cm) with a heating rate of 1° C. min$^{-1}$ from 25° C. to 450° C. and held for 240 minutes at 450° C. in a gas stream of helium containing 1% by volume nitric oxide (NO) or in air. The samples were then allowed to cool down to 25° C. under helium. The parts of samples D and E thermally treated in a gas stream comprising helium containing 1% by volume nitric oxide (NO) according to the present invention were denoted D-1 and E-1, while the parts calcined in a stream of air, not according to the present invention, were denoted as D-2 and E-2. The preparative conditions are summarized in Tables 2, 3 and 5. The samples were characterised using XRD and STEM.

TABLE 5

Impregnation conditions

| | Cobalt (D) | Nickel (E) |
|---|---|---|
| Support | Davicat SI 1404* | Davicat SI 1404* |
| Support Quantity (g) | 1 | 1 |
| Solvent | Demineralized water | Demineralized water |
| Precursor | Co(NO$_3$)$_2$ • 6H$_2$O | Ni(NO$_3$)$_2$ • 6H$_2$O |
| Concentration Precursor solution (M) | 3.01 | 4.23 |
| Impregnation | 60 mbar pore volume no rotation | 60 mbar pore volume no rotation |
| Equilibration time (min) | 15 | 15 |

*Commercially available at Grace Davison, average pore diameter 6.5 nm.

Figure 5:
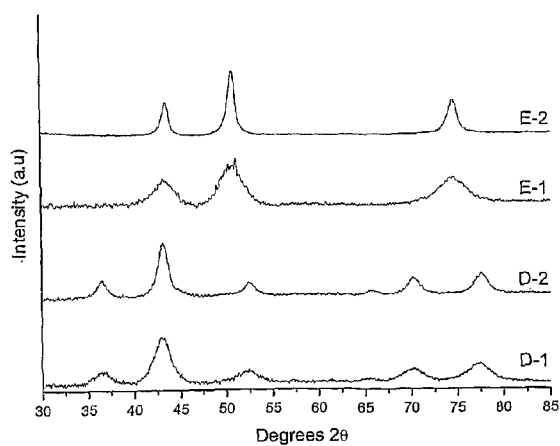
FIG. 5 depicts XRD patterns of a silica supported cobalt oxide prepared according to the invention (D-1) and not according to the invention (D-2), and (b) silica-supported nickel oxide prepared according to the invention (E-1) and not according to the invention (E-2)

The XRD patterns of the samples D-1, D-2, E-1 and E-2 as depicted in FIG. 5 reveal that the same cobalt and nickel oxide phases are formed as observed for the samples A-1, A-2, B-1, B-2, C-1 and C-2 in example 1, namely Co$_3$O$_4$ and NiO. The diffractograms of the samples D-1 and E-1 show that small cobalt and nickel oxide crystallites are formed whereas the samples D-2 and E-2 that were calcined contain large cobalt and nickel oxide crystallites. The average crystallite sizes are presented in Table 6.

TABLE 6

Overview of average cobalt and nickel oxide crystallite sizes

| Sample | Gas composition thermal treatment | d$_{XRD}$ (nm) | d$_{TEM}$ (nm) |
|---|---|---|---|
| D-1 | NO/He | 5 | 4-5 |
| D-2 | Air | 11 | 8-60 |
| E-1 | NO/He | 4 | 3-4 |
| E-2 | Air | 15 | 20-80 |

Figure 6:
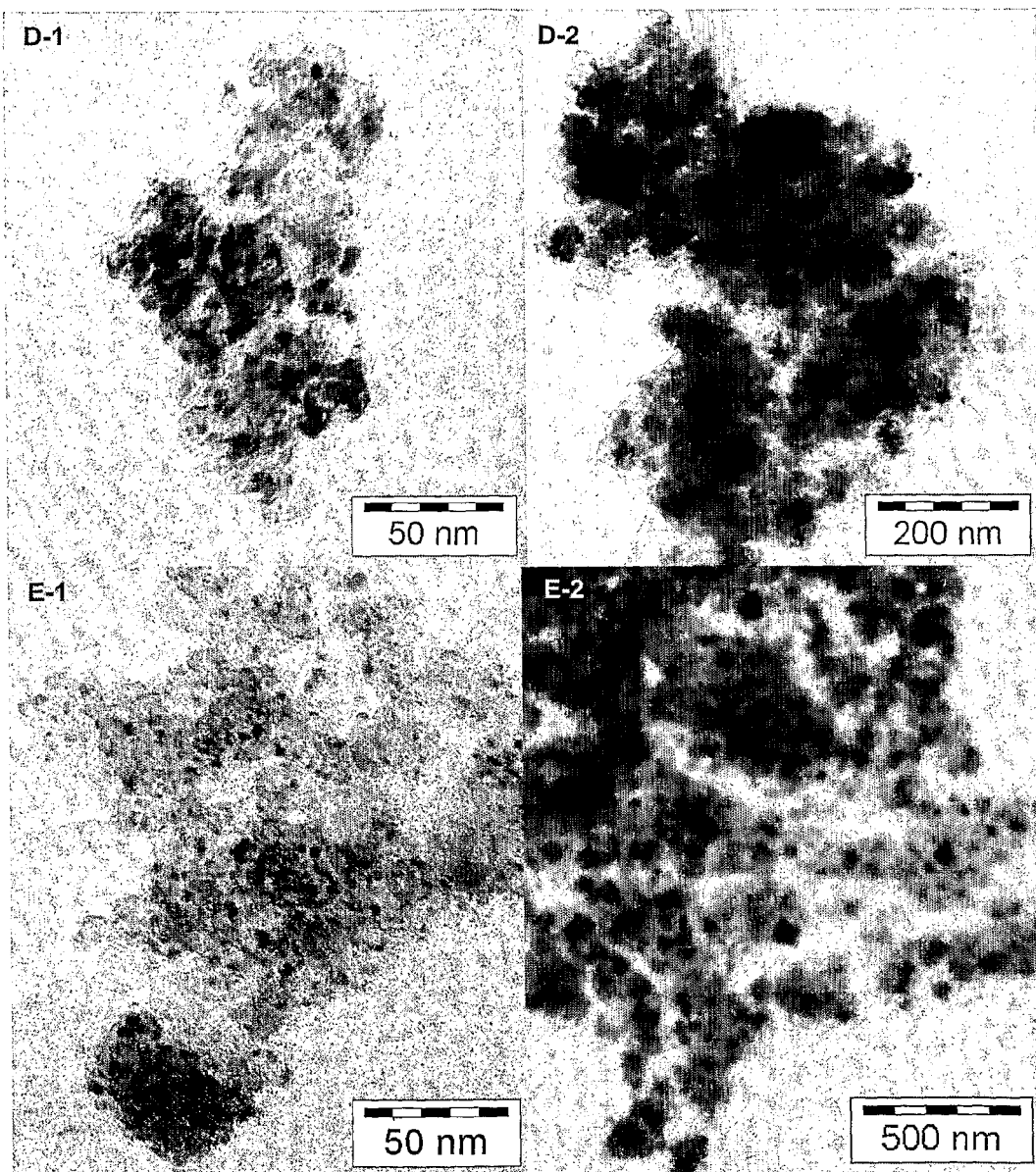
FIG. 6 depicts bright-field STEM micrographs of the silica-supported cobalt (D-1, D-2) and nickel (E-1, E-2) oxides.

Typical bright-field STEM images as presented in FIG. 6 confirm the XRD results as highly dispersed cobalt and nickel oxide crystallites are found in the samples D-1 and E-1 that were treated according to present invention. Moreover the cobalt and nickel oxide crystallites are homogeneously distributed throughout the support. The observed average cobalt and nickel oxide particle sizes are reported in Table 6.

Example 3

Catalyst for the Preparation of Hydrocarbons from Carbon Monoxide and Hydrogen The cobalt oxide on silica gel catalyst sample D-1 from example 2 was tested for its catalytic activity in the preparation of hydrocarbons from a mixture of carbon monoxide and hydrogen. Prior to testing the sample was reduced for 120 minutes at 450° C. in a helium gas stream containing 33 vol % hydrogen. The reduction conditions are summarised in Table 7.

TABLE 7

Reduction conditions

| Step N° | Duration (min) | T$_{start}$ (° C.) | T$_{final}$ (° C.) | Heating Rate (° C. min$^{-1}$) | Helium (ml min$^{-1}$) | Hydrogen (ml min$^{-1}$) |
|---|---|---|---|---|---|---|
| 1 | 85 | 25 | 450 | 5 | 40 | 20 |
| 2 | 240 | 450 | 450 | 0 | 40 | 20 |

Figure 7:
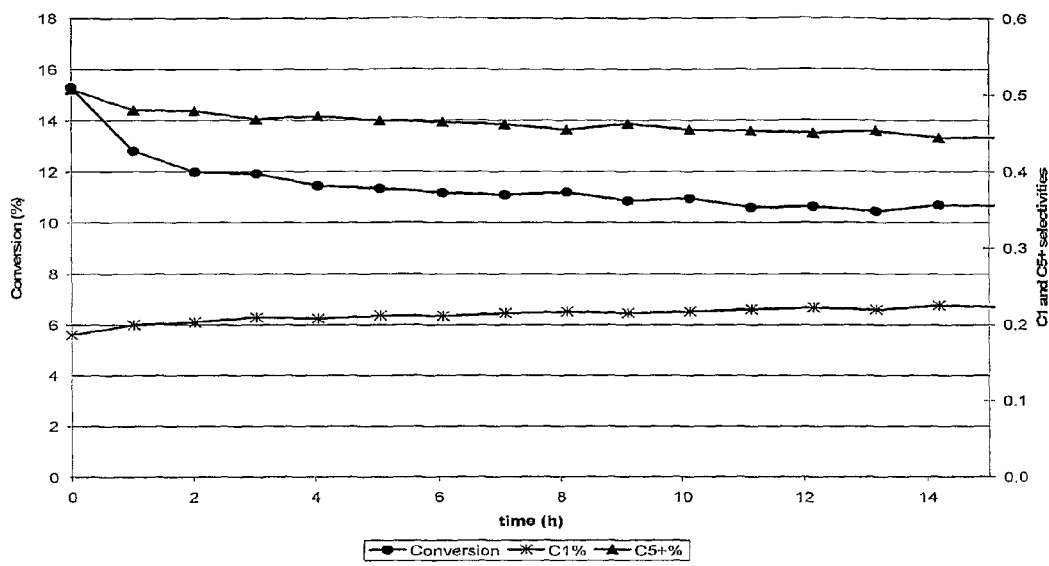
FIG. 7 depicts conversion % and C1 & C5+% selectivities against time for the catalyst D-1 tested in the laboratory-scale synthesis of hydrocarbons by the Fischer Tropsch reaction

The catalytic activity tests were carried out using a plug-flow reactor (diameter 0.5 cm, length 4 cm) at 1 bar and 220° C. with a hydrogen/carbon monoxide volume ratio of 2 and a GHSV≈6500 h$^{-1}$. To achieve isothermal plug-flow conditions a small quantity of sample (20.5 mg) was mixed with 250 mg SiC particles (0.2 mm). The output gas flow was analysed using gas chromatography. From these results the weight selectivities towards methane (C$_1$/C$_{tot}$) and products with a chain length of 5 and higher (C$_{5+}$/C$_{tot}$) were calculated. FIG. 7 shows results recorded during the first 15 hours of reaction. It is clear that sample D-1 prepared according to the present invention has a high overall activity. Despite its high loading of 18 wt % Co, at 2% CO conversion (at a GSHV of 34000 h$^{-1}$) an excellent cobalt time yield of 3.44×10$^{-5}$ mol$_{CO}$.g$_{Co}$.s was obtained.

Example 4

Preparation of Hydrocarbons from Carbon Monoxide and Hydrogen

Small quantities (ca. 20 mg) of the cobalt oxide on silica gel catalysts were tested for their catalytic activity in the preparation of hydrocarbons from a mixture of carbon monoxide and hydrogen. The catalysts were prepared according to the present invention (sample D-1) or conventional calcination in air (sample D-2) as described in Example 2. Prior to testing the samples were in situ reduced for 120 minutes using different final temperatures and a helium gas stream containing 33% by volume of hydrogen. The samples were heated from room temperature to the final temperature using a heating rate of 5° C.min$^{-1}$. Details of the reduction conditions are summarised in Table 8. A series of samples D-1 was created using final reduction temperatures of 350° C., 400° C., 450° C., 500° C., 550° C. and 600° C. A series of samples D-2 was prepared using final reduction temperatures of 350° C., 450° C. and 550° C.

TABLE 8

Reduction conditions

| Step N° | Duration (min) | $T_{final}$* (° C.) | Heating Rate (° C. · min⁻¹) | Helium (ml · min⁻¹) | Hydrogen (ml · min⁻¹) |
|---|---|---|---|---|---|
| 1 | variable | 350-600 | 5 | 40 | 20 |
| 2 | 120 | 350-600 | 0 | 40 | 20 |

*final temperatures of 350° C., 400° C., 450° C., 500° C., 550° C. and 600° C. were used The catalytic activity tests were carried out at 1 bar and 220° C. using a plug-flow reactor (diameter 0.5 cm, length 4 cm) and a hydrogen/carbon monoxide volume ratio of 2. To achieve isothermal plug-flow conditions a small quantity of the sample (20 mg) was mixed with 250 mg silicium carbide particles with a diameter of 0.2 mm. The output gas flow was analysed using gas chromatography. From these results the activities were calculated. The activities are defined as the number of moles of carbon monoxide converted per gram of cobalt per second, referred to as the cobalt time yield (CTY).

Figure 8:
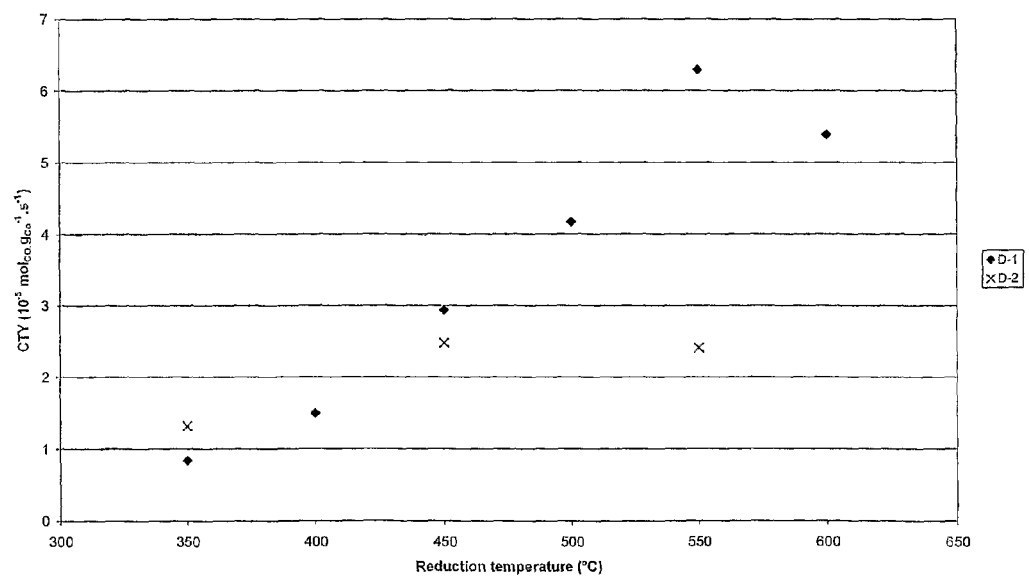
FIG. 8 depicts catalyst activity in the laboratory-scale synthesis of hydrocarbons by the Fischer Tropsch reaction in terms of cobalt time yield (molCO.gCo-1.s-1) against catalyst reduction temperature for the catalysts D-1 and D-2.

FIG. 8 shows the activity results obtained after the first 18-22 hours of reaction and a conversion of 2-3%. The results for sample D-1 that was prepared according to the present invention clearly show that the activity increases to a large extend upon increasing the reduction temperature from 350° C. to 550° C. Upon going from a reduction temperature of 350° C. to 550° C., an increase of the CTY from $0.84 \times 10^{-5}$ $mol_{CO} \cdot g_{Co}^{-1} \cdot s^{-1}$ to $6.29 \times 10^{-5}$ $mol_{CO} \cdot g_{Co}^{-1} \cdot s^{-1}$ is observed. Further increasing of the reduction temperature to 600° C. lowered the activity to $5.39 \times 10^{-5}$ $mol_{CO} \cdot g_{Co}^{-1} \cdot s^{-1}$.

The catalytic results obtained for sample D-2 that was prepared via conventional calcination in air and subsequent reduction at 350, 450 and 550° C. demonstrate that the increase of the activity upon increasing the reduction temperature is small by comparison. Increasing the reduction temperature from 350° C. to 550° C. results only in a CTY increase from 1.32 $mol_{CO} \cdot g_{Co}^{-1} \cdot s^{-1}$ to 2.41 $mol_{CO} \cdot g_{Co}^{-1} \cdot s^{-1}$. Comparison between the samples D-1 and D-2 that were reduced at 550° C. clearly demonstrates the impact of the present invention as the activity of sample D-1 is more than two times higher than that of the conventional prepared catalyst (sample D-2).

Example 5

Catalyst for Hydrogenation of Soybean Oil

A 24% wt Ni on silica catalyst was prepared according to the method of the present invention as described in Example 2 (Catalyst E-1). The required catalyst amount was weighed into a glass vessel and reduced under atmospheric hydrogen pressure at 400-450° C. for 1 hour. The reduced catalyst was transferred into soybean oil for hydrogenation testing.

In the hydrogenation test a soybean oil of iodine value (IV) 133 was used. 200 g of the oil and the required amount of reduced catalyst were charged to a closed, stirred, hydrogenation reactor. The mixture was heated to 140° C. and hydrogen sparged through the slurry at a pressure of 3 bar abs. The temperature was raised by 2° C./min to 200° C. and kept at that temperature. The amount of hydrogen absorbed into the oil was monitored and the test was terminated once the IV had dropped to 79. The hydrogenation time to reach an IV of 79 was used as a measure of the activity of the catalyst. The results for this, and a comparative catalyst calcined in air, are given below;

TABLE 9

Hydrogenation Test results

| Catalyst | Amount (g) | Hydrogenation Time (min) | End IV (gI₂/100 g) | Trans (%) | Melting Point (° C.) |
|---|---|---|---|---|---|
| Comparative | 0.0706 | 148 | 79.0 | 34.8 | 45.4 |
| E-1 | 0.0707 | 101 | 79.2 | 37.7 | 45.0 |

The results demonstrate a considerably higher activity for the catalyst prepared by the method of the present invention.

Example 6

Co on Alumina Catalyst

20% wt Co on alumina catalysts were prepared as follows. 20.05 g of a gamma alumina powder (BET 148 m²/g pore volume 1.04 ml/g) was impregnated by an incipient wetness impregnation method using a heated solution comprising 25.04 g Co(NO₃)₂ 6(H₂O) and 4.95 g of deionised water. The impregnated powder was dried for 30 min at 110° C. then calcined under a flow of Helium containing 1% by volume NO, at flowrates of 35 L/h and 40 L/h) at 240° C. for 1 h (heating rate 2° C./min). For comparison, calcinations were carried out under an equivalent flow of air. XRD measurements were taken on the calcined materials to determine the Co oxide crystallite size. The catalyst precursors according to the invention were also subjected to reduction at 425° C. using hydrogen and the Co surface area determined using hydrogen chemisorption at 150° C. according to a known method. The results are given in Table 10.

TABLE 10

Cobalt oxide crystallite size obtained by XRD

| Gas | Flow rate (L/h) | Calcination Temp (° C.) | Calcination Time (h) | Cobalt crystallite size (nm) | Co SA (m²/g cat) |
|---|---|---|---|---|---|
| He/NO | 35 | 240 | 1 | 10.5 | 10.9 |
| He/NO | 40 | 240 | 1 | 8.8 | 12.4 |
| Air | 35 | 240 | 1 | 12.9 | |
| Air | 40 | 240 | 1 | 13.0 | |

The results demonstrate that the calcination method according to the present invention is effective in reducing the Co oxide crystallite size and thereby increase the resulting Co surface area compared to air calcination of the same material.

Comparative Example

SBA-15 Supported Nickel Oxide Prepared by not Purging the Atmosphere During Calcination in Air This experiment was performed to demonstrate the effectiveness of the present invention over the disclosure of EP0421502.

A quantity of 0.25 g of SBA-15 powder with a BET surface area of 637 m² g⁻¹ and total pore volume of 0.80 cm³ g⁻¹ was impregnated to incipient wetness using an 4.23 mol.l⁻¹ aqueous nickel (II) nitrate solution to provide 20 wt % Ni/SiO₂ (sample F). After an equilibration time of 15 minutes the impregnated solid was transferred to an oven dish (volume 0.062 dm³, height 4 cm, diameter 6 cm) and dried by heating the sample with a heating rate of 1° C. min⁻¹ from 25° C. to a final temperature of 120° C. The sample was kept at the final temperature for 720 minutes. Subsequently, a lid was placed on the oven dish and the sample was given a second heat treatment in air (i.e. calcination) by heating the sample with a heating rate of 1° C.min$^{-1}$ from 25° C. to 450° C. and maintaining the temperature of 450° C. for 240 minutes. Thus, during the calcination treatment no active purging of the sample atmosphere took place. The sample was denoted F-1.

Figure 9:
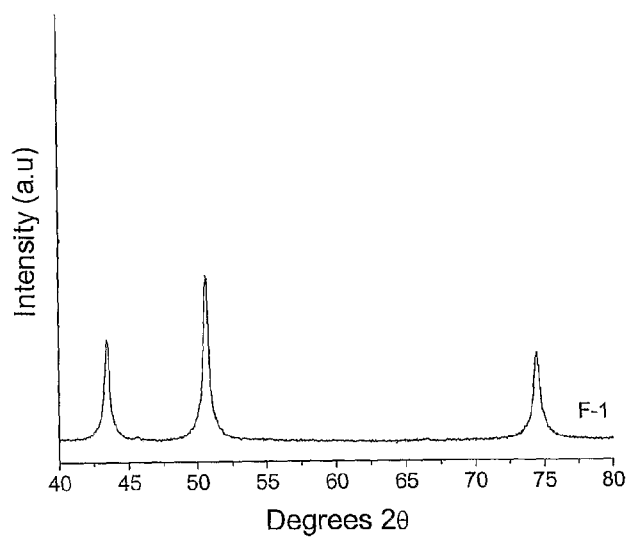
FIG. 9 depicts an XRD pattern of a comparative nickel oxide on silica catalyst (F-1) prepared according to the method disclosed in EP0421502.

The XRD pattern of sample F-1 is depicted in FIG. 9. The diffractogram demonstrates that very large nickel oxide (NiO) crystallites are formed when sample F is thermally treated in an air atmosphere that is not actively purged. The observed average crystal size for this sample F-1 is 32 nm.

Figure 10:
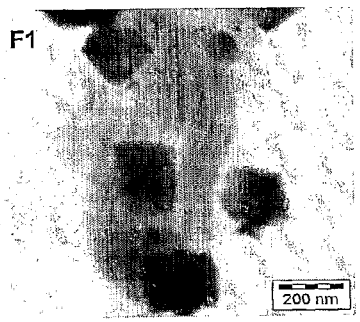
FIG. 10 depicts bright-field STEM micrographs of the comparative catalyst F-1.

A typical bright-field STEM image of sample F-1 is shown in FIG. 10. The electron micrograph shows that the ordered mesopore structure of SBA-15 was retained during the steps in preparation. Furthermore, the image demonstrates that the calcination treatment has led to a sample where the nickel oxide particles are inhomogeneously distributed over the support and have a broad distribution in size. In more detail, relatively large nickel oxide particles with sizes ranging from 25-200 nm are found to be present at the exterior surface of the SBA-15 particles. Furthermore, anisotropic nickel oxide particles are found inside the mesoporous channels of the support. The latter type of particles appears to have been limited in their growth by the walls of the mesoporous support.

Figure 11:
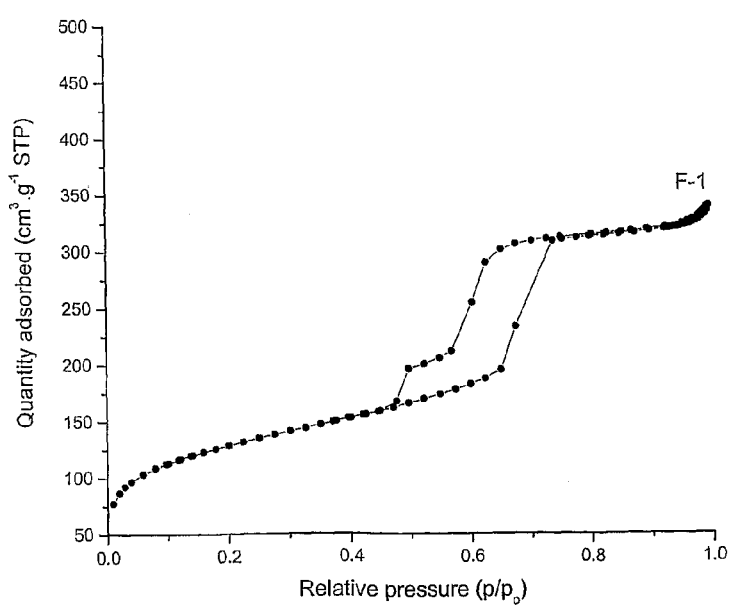
FIG. 11 depicts nitrogen physisorption isotherms of the comparative catalyst F-1.

The adsorption branch of the nitrogen physisorption isotherm of sample F-1 (in FIG. 11) contains all typical features reported for SBA-15. This demonstrates that the structure is not significantly damaged by the steps in the preparation. The desorption branch of the isotherm contains a feature that is typical for ink-bottle type pores, namely a forced closure at a relative pressure of approximately 0.48. These ink-bottle pores originate from the nickel oxide crystallites that plug the mesoporous channels of the SBA-15.

The invention claimed is:

1. A method for converting a supported metal nitrate into the corresponding supported metal oxide comprising oxidizing by heating the metal nitrate to effect its decomposition under a flowing gas mixture comprising nitric oxide at a concentration in the range 0.001 to 15% by volume and having an oxygen content of <5% by volume, wherein the nitric oxide is not generated by decomposition of the metal nitrate and wherein the metal nitrate is not first subjected to a calcination step at a temperature at or above the decomposition temperature of the metal nitrate prior to the oxidizing step.

2. A method according to claim 1 wherein the metal nitrate is impregnated onto a support material from a solution and dried to remove the solvent before heating the metal nitrate to convert it to the corresponding metal oxide.

3. A method according to claim 2 wherein the metal nitrate is dried at a temperature of $\leqq 200°$ C.

4. A method according to claim 3 wherein the metal nitrate is dried at a temperature of $\leqq 160°$ C.

5. A method according to claim 1 wherein the gas mixture consists of one or more inert gases and nitric oxide.

6. A method according to claim 5 wherein the inert gas is selected from the group consisting of nitrogen, helium and argon.

7. A method according to claim 1 wherein the supported metal nitrate is heated to a temperature in the range 100-1200° C.

8. A method according to claim 1 wherein the metal nitrate is a transition metal nitrate.

9. A method according to claim 1 wherein the metal nitrate is a nitrate of a metal selected from the group consisting of nickel, cobalt, copper, and iron.

10. A method according to claim 1 wherein the support is selected from the group consisting of a metal, carbon, a metal oxide, a mixed metal oxide and a solid polymer support.

11. A method according to claim 1 wherein the support is selected from the group consisting of alumina, metal-aluminate, silica, aluminosilicate, titania, zirconia and mixtures of these.

12. A method according to claim 1 wherein the supported metal oxide is a reducible metal oxide, further comprising heating the supported metal oxide under a reducing gas stream to effect reduction of at least a part of the metal oxide.

13. A method according to claim 12 wherein the reducing gas stream comprises at least one of carbon monoxide and hydrogen.

14. A method according to claim 12 wherein the supported metal oxide is selected from the group consisting of nickel oxide, cobalt oxide, copper oxide and iron oxide and the reduction is performed with a hydrogen-containing gas.

15. A method according to claim 1 wherein the metal nitrate is a nitrate of a metal selected from the group consisting of La, Zr, Cr, Mn, Fe, Ru, Co, Rh, Ir, Ni, Pd, Pt, Cu and Zn.

16. A method according to claim 1 wherein the metal nitrate is a nitrate of a metal selected from the group consisting of Cr, Mn, Fe, Ru, Co, Rh, Ir, Ni, Pd, Pt, Cu and Zn.

17. A supported oxide obtained by the method of claim 1.

18. A supported reduced metal oxide obtained by the method of claim 12.

* * * * *